United States Patent
Dinh et al.

(10) Patent No.: US 6,299,254 B1
(45) Date of Patent: Oct. 9, 2001

(54) HEAD RESTRAINT

(75) Inventors: Vinh-Khuong Dinh, Reutlingen; Vasilios Orizaris, Renningen; Frank Rauscher, Walddorfhaeslach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/368,417

(22) Filed: Aug. 5, 1999

(30) Foreign Application Priority Data

Aug. 5, 1998 (DE) .................................. 198 35 355

(51) Int. Cl.⁷ ........................................................ A47C 7/38
(52) U.S. Cl. .......................... 297/408; 297/403; 297/405
(58) Field of Search .................................... 297/408, 403, 297/391, 405

(56) References Cited

U.S. PATENT DOCUMENTS

| | | | | |
|---|---|---|---|---|
| 256,711 | * | 4/1882 | Liscomb | 297/405 X |
| 361,906 | * | 4/1887 | Stiles | 297/405 X |
| 377,147 | * | 1/1888 | Delaney | 297/403 |
| 490,090 | * | 1/1893 | Watkins | 297/405 |
| 657,360 | * | 9/1900 | Ritter | 297/405 X |
| 660,694 | * | 10/1900 | Waterbury | 297/405 X |
| 671,299 | * | 4/1901 | Sibley | 297/405 |
| 671,300 | * | 4/1901 | Sibley | 297/405 |
| 684,841 | * | 10/1901 | Merker | 297/405 X |
| 866,753 | * | 9/1907 | Weber | 297/405 |
| 893,016 | * | 7/1908 | Ritter | 297/405 X |
| 968,403 | * | 8/1910 | Pfanschmidt | 297/408 |
| 1,008,456 | * | 11/1911 | Etter | 297/405 X |
| 2,865,434 | * | 12/1958 | Grenz | 297/403 |
| 3,170,725 | * | 2/1965 | Komorowski | 297/403 X |
| 3,174,799 | * | 3/1965 | Haltenberger | 297/403 |
| 3,574,401 | * | 4/1971 | Lehner | 297/403 X |
| 4,576,411 | * | 3/1986 | Kitamura | 297/408 X |
| 4,623,166 | | 11/1986 | Andres et al. | 297/403 X |
| 4,822,102 | | 4/1989 | Duvenkamp | 297/403 |
| 5,003,240 | | 3/1991 | Ikeda | 297/408 X |
| 5,145,233 | * | 9/1992 | Nagashima | 297/403 X |
| 5,346,282 | * | 9/1994 | De Filippo | 297/403 X |
| 5,669,668 | | 9/1997 | Leuchtmann | 297/408 |

FOREIGN PATENT DOCUMENTS

| | | | |
|---|---|---|---|
| 2023682 | * | 12/1972 | (DE) ................................... 297/408 |
| 3131633 | * | 2/1983 | (DE) ................................... 297/408 |
| 44 11 471 | | 10/1995 | (DE) . |
| 2069328 | | 8/1981 | (GB) . |
| WO 97/08013 | | 3/1997 | (WO) . |

* cited by examiner

Primary Examiner—Peter M. Cuomo
Assistant Examiner—Rodney B. White
(74) Attorney, Agent, or Firm—Crowell & Moring, L.L.P.

(57) ABSTRACT

A head restraint for a vehicle seat which has a seat back or backrest, having a head cushion and a retaining device. The retaining device secures the head cushion pivotably to the backrest. The retaining device is designed such that the head cushion can be pivoted between an upper functional position and a lower-lying rest or non-functional position. For the purpose of simplifying the retaining device in terms of design and manufacture, the head cushion and retaining device are connected to each other via a pivot which is aligned transversely with respect to the backrest front surface and passes eccentrically through the plane of symmetry of the head cushion.

20 Claims, 2 Drawing Sheets

HEAD RESTRAINT

BACKGROUND AND SUMMARY OF THE INVENTION

This application claims the priority of German patent 198 35 355.3, filed Aug. 5, 1998, the disclosure of which is expressly incorporated by reference herein.

The invention relates to a head restraint for a vehicle seat, which has a seat back or backrest having a head cushion and a retaining device, which secures the head cushion pivotably to the backrest and is designed in such a manner that the head cushion can be pivoted between an upper functional position and a lower-lying rest or non-functional position.

In the case of a known head restraint of this type, known for example, from commonly owned German patent document (DE 44 11 471 A1), which is designed for rear seats, the retaining device, which is designed as a swinging mechanism, has a supporting plate which is fastened on the parcel shelf of the vehicle body directly behind the backrest of the rear seat. A horizontally aligned pivot is mounted rotatably in mounts fastened on the supporting plate, and on the pivot there are arranged, in a rotationally fixed manner, two supporting brackets which are connected to each other by a transverse rod and in each case have a socket for two retaining hoops which support the head cushion. Mechanical pivoting of the head cushion leads to the latter being transferred into its functional position above the upper edge of the backrest and being automatically locked there. While pivoting upwards a restoring spring is tensioned and is retained under tension in the functional position by the lock. The unlocking is done under remote control via a pneumatic release element, after which the head cushion is pivoted away by the restoring spring into its non-functional or rest position, in which it lies below the backrest upper edge and does not impede the driver's view to the rear.

The invention is based on the object of simplifying the design of a retaining device for a head restraint of the type generally described above.

This and other objects have been achieved according to the present invention by providing a head restraint for a vehicle seat having a backrest, comprising: a head cushion; and a retaining device including a pivot coupling the head cushion pivotably to the backrest, said pivot being aligned transversely to a front surface of the backrest and passing eccentrically through the plane of symmetry of the head cushion such that the head cushion is pivotable between an upper functional position and a lower nonfunctional position.

This and other objects have been achieved according to the present invention by providing a retaining device for pivotably coupling a head cushion to a vehicle seat backrest, comprising: a bearing to be coupled to the vehicle seat backrest such that a pivot axis defined by said bearing extends at least approximately perpendicularly to a front surface of the backrest; a pivot pin to be coupled to a lower portion of the head cushion, said pivot pin being disposed in said bearing to be rotatable about said pivot axis between a first position corresponding to an upper functional position of the head cushion and a second position corresponding to a lower nonfunctional position of the head cushion; and at least one locking mechanism which releasably locks said pivot pin to said bearing in said first position.

This and other objects have been achieved according to the present invention by providing a method of pivotably coupling a head cushion to a vehicle seat backrest, comprising: coupling a bearing to the vehicle seat backrest such that a pivot axis defined by said bearing extends at least approximately perpendicularly to a front surface of the backrest; coupling a pivot pin to a lower portion of the head cushion; coupling said pivot pin to said bearing to be rotatable about said pivot axis between a first position corresponding to an upper functional position of the head cushion and a second position corresponding to a lower nonfunctional position of the head cushion; and providing at least one locking mechanism to releasably lock said pivot pin to said bearing in said first position.

The head restraint according to the invention has the advantage that instead of the swinging mechanism, which is complicated in terms of manufacture, a very simple rotational mechanism makes it possible to bring the head cushion into the higher-level functional position and into the lower-level non-functional position. It is ensured that, on the one hand, in the lower-lying non-functional position the head cushion does not block or interfere with the driver's free view to the rear and, on the other hand, in the higher-placed functional position the minimum height dimensions prescribed by law are observed. In addition, the rotational mechanism according to the invention is small in terms of structure and can easily be fastened to the backrest itself and simply covered there. The rotational mechanism therefore does not require—as the known swinging mechanism—an additional installation place on the vehicle body behind the backrest and is therefore also suitable for use in the case of front seats and, in particular, in the case of rear seats in estate vehicles in which, for example, a parcel shelf required by the known swinging mechanism is absent.

According to a preferred embodiment of the invention, the retaining device has a bearing cup, with a cup axis which is coaxial to the pivot, which cup rotatably accommodates a pivot pin, which protrudes on the rear side of the head cushion. The pivot pin is arranged in the head-cushion region which is lower in the functional position of the head cushion and is connected fixedly to the head cushion. These design measures make it possible for the rotational connection, according to the invention, between the head cushion and retaining device to be brought about in a very simple manner in terms of manufacture.

According to an advantageous development of the invention, the bearing cup is fastened on a supporting hoop which is designed to be accommodated, preferably height-adjustably, in a guide sleeve integrated in the backrest. This refinement of the design makes it possible to remove the head restraint from, and fit it to, the vehicle seat very rapidly and without using a tool. It also opens up the possibility of an additional height adjustment of the head restraint for particularly tall vehicle passengers.

Other objects, advantages and novel features of the present invention will become apparent from the following detailed description of the invention when considered in conjunction with the accompanying drawings.

DETAILED DESCRIPTION OF THE DRAWINGS

Figure 1:
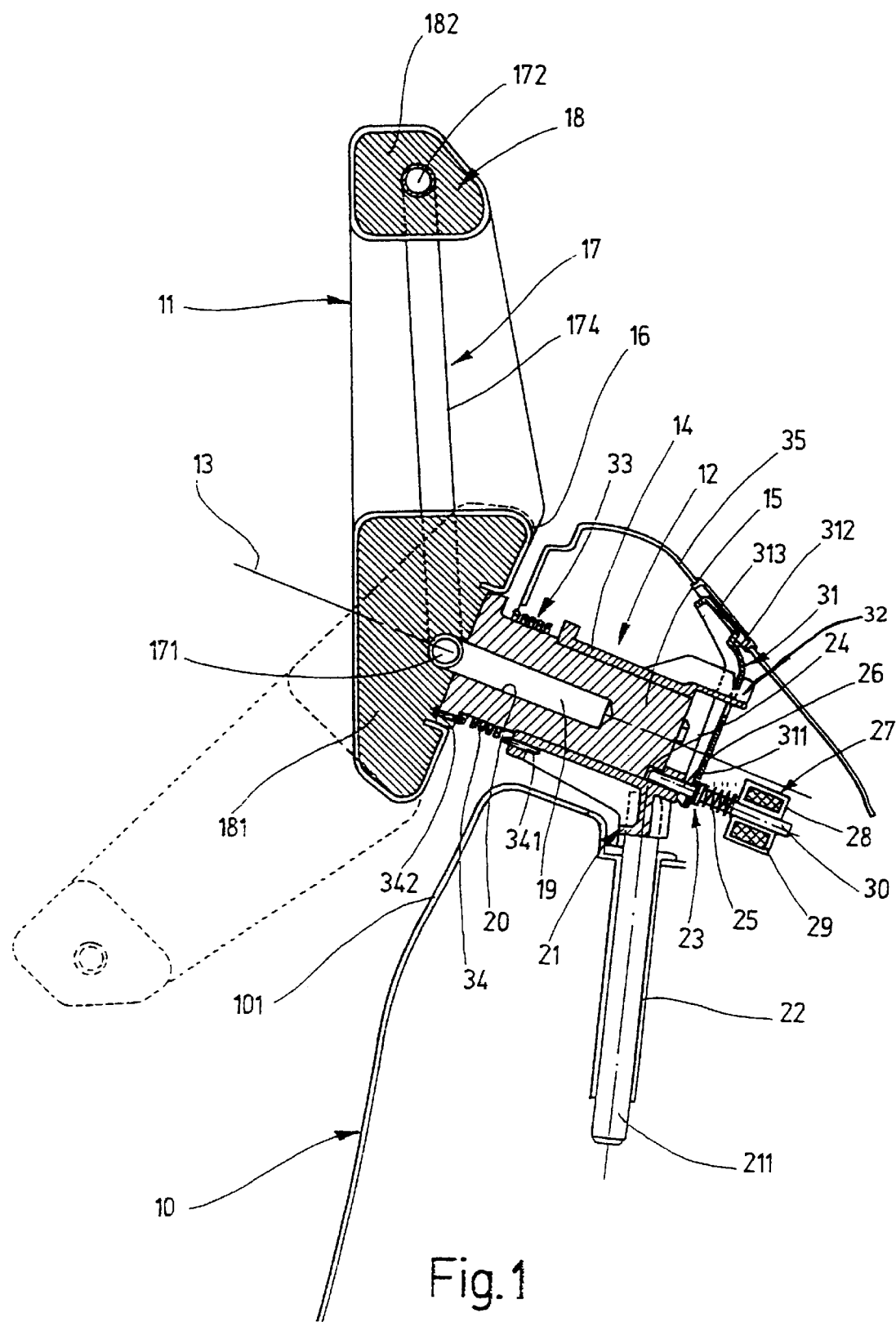
FIG. 1 shows a longitudinal section of a head restraint in conjunction with a sectionally represented backrest of a vehicle seat, according to a preferred embodiment of the present invention.
Figure 2:
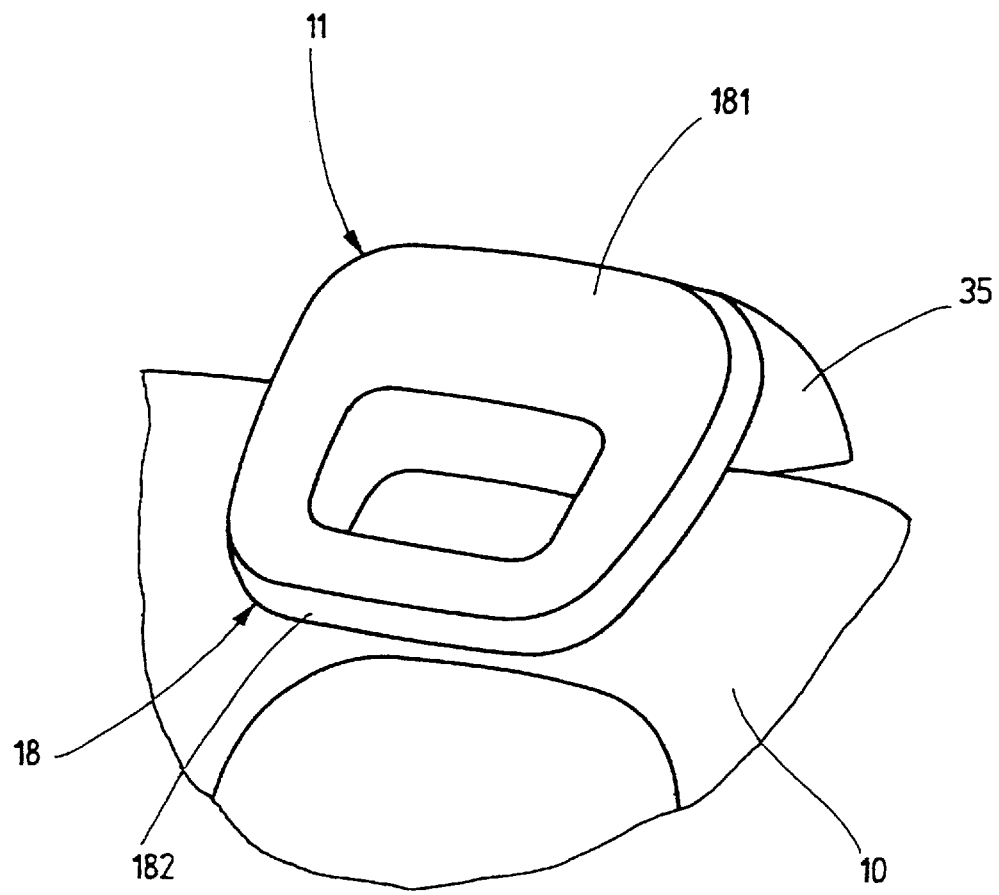
FIG. 2 shows a perspective front view of the head restraint in the non-functional position of the head cushion.

The head restraint, which is represented in longitudinal section in FIG. 1, for fastening on a seat back or backrest 10 of a vehicle seat, has a head cushion 11 for supporting the head and a retaining device 12 which retains the head cushion 11 and is secured in the backrest 10. The retaining device 12 makes it possible for the head cushion 11 to be pivoted from its functional upper position, which is shown in lines in FIG. 1, into a lower-lying rest or non-functional position, which is shown in dashed lines in FIG. 1, and vice versa. In the functional position the head cushion 11 ensures that the heads of vehicle passengers of various heights are supported at the minimum height prescribed by law, and in the non-functional position the head cushion 11 is moved downward sufficiently far for the driver's view to the rear to be cleared, i.e. the head cushion 11 is not annoyingly situated in the field of view of the driver during reversing.

The ability of the head cushion 11 to pivot is enabled by a pivot 13 between the head cushion 11 and the retaining device 12, the pivot being aligned transversely (e.g., essentially perpendicularly) to the backrest front surface 101 and acting eccentrically in the plane of symmetry of the head cushion 11. In detail, the retaining device 12 has, for this purpose, a bearing cup 14, with a cup axis which is coaxial to the pivot 13, which cup rotatably accommodates a pivot pin 15, which protrudes on the rear side of the head cushion 11. The pivot pin 15 is arranged in the head-cushion region which is lower in the functional position of the head cushion 11 and is connected fixedly to the head cushion 11. The rear side of the head cushion 11 in the lower head-cushion region is bevelled in such a manner that its oblique surface 16 runs approximately parallel to the backrest front surface 101 of the backrest 10. The head cushion 11 has a supporting frame 17 which is composed of four frame legs 171–174 and is provided with upholstery 18 surrounding it. A proximal portion 181 of the upholstery 18 which covers the transversely extending frame strut 171 which is lower, in the functional position of the head cushion 11, is of substantially wider design in the vertical direction than a distal portion 182 of the upholstery 18 on the upper frame strut 172 which is parallel thereto. The upholstery 18 around the two lateral frame struts 173, 174 is of identical design. For the fastening of the pivot pin 15 on the head cushion 11, a retaining bolt 19, which protrudes to the rear at an obtuse angle with respect to the supporting frame 17, is fastened rigidly in the center, at the transversely extending frame strut 171 which is lower in the functional position of the head cushion 11. This retaining bolt 19 is inserted into a coaxial blind hole 20 in the pivot pin 15 and fastened therein.

The bearing cup 14 itself is fastened rigidly on a supporting hoop 21, which is designed such that it can be inserted by its two hoop legs 211 into a guide sleeve 22 in each case. The two guide sleeves 22 are placed at a parallel distance from each other into the backrest 10 from the upper edge thereof, and are provided with a latching mechanism (not shown in further detail here) which permits the hoop legs 211 to be latched into the guide sleeves 22 at different insertion lengths of the hoop legs 211. The entire head restraint can thus be adjusted in its distance relative to the upper edge of the backrest 10.

In the functional position (shown in unbroken lines in FIG. 1) of the head cushion 11, the pivot pin 15 is locked releasably to the bearing cup 14, the locking 23 being actuated automatically when the head cushion 11 is pivoted into its functional position and being able to be released again manually and/or under the action of auxiliary power. The lock 23 consists of a recess 24, which is made in the free end side of the pivot pin 15, and of a locking pin 26 which engages into the recess 24 under the spring force of a locking spring 25 and is retained in an axially displaceable manner on the bearing cup 14. For releasing the lock 23 there is provided a solenoid 27, which consists in a customary manner of a magnet housing 28, an exciter coil 29 and armature 30, the armature 30 being connected fixedly to the locking pin 26. The locking spring 25 is supported between the magnet housing 28 and the locking pin 26. If the solenoid 27 is supplied with current, which can be triggered, for example, from the drivers seat, the armature 30 retracts and lifts the locking pin 26 out of the recess 24 so that the lock 23 is ineffective.

As an alternative or in addition, there is pivotably mounted on the bearing cup 14 a two-armed lever arm 31 whose one lever arm 311 is coupled to the locking pin 26 and on whose other lever arm 312 an actuating surface 313 is formed for the manual actuation. The coupling of the lever arm 311 and locking pin 26 takes place via a collar 32 which is formed on the locking pin 26 and is grasped from behind by the lever arm 311 on one side and on whose other side the locking spring 25 is supported. If a compression force, for example, by a finger, is applied to the actuating surface 313, the lever arm 311 in FIG. 1 pivots counterclockwise and carries along the locking pin 26 via the collar 32 sufficiently far for said pin to emerge completely from the recess 24. The lock 23 is thus released again.

For the automatic return of the head cushion 11 from its functional position into its non-functional position, a restoring spring 33 is provided which is tensioned when the head cushion 11 is transferred from its non-functional position into the functional position, and is retained in its tensioned position by the lock 23. If the lock 23 is released, the restoring force of the restoring spring 33 returns the head cushion 11 back into its non-functional position, which is shown in dashed lines in FIG. 1. In the exemplary embodiment of FIG. 1, the restoring spring 33 is designed as a spiral or leg spring 34 which is pushed onto the pivot pin 15 and having one spring end 341 fastened on the bearing cup 14 and having another spring end 342 fastened on the pivot pin 15.

The entire retaining device 12 is covered by a covering hood 35 which conceals the retaining device 12 and to this end is adapted in visual terms to the upper-edge region of the backrest 10. At the same time, the dimensions of the covering hood 35 and head cushion 11 and the arrangement of the pivot pin 13 on the head cushion 11 are coordinated with one another in such a manner that in the pivoted-away non-functional position of the head cushion 11, the lower edge of the head cushion 11, which edge is now situated at the top, is essentially flush with the upper edge of the covering 35.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Head restraint for a backrest of a vehicle, comprising:
   a head cushion; and
   a retaining device including a pivot adapted to be positioned above a backrest for coupling the head cushion pivotably to the backrest,
   said pivot being aligned transversely to a front surface of the backrest and passing eccentrically through a plane of symmetry of the head cushion such that the head cushion is pivotable between an upper functional position and a lower nonfunctional position, wherein the retaining device includes a bearing cup having a cup axis coaxial with said pivot, said pivot including a pivot pin coupled to said head cushion and extending rearwardly of a proximal portion of the head cushion which is lower in the functional position, said cup rotatable accommodating said pivot pin, wherein said proximal portion of the head cushion is bevelled on a rearward side to define an oblique surface running approximately parallel to the front surface of the backrest.

2. Head restraint according to claim 1, wherein said head cushion includes an upholstered supporting frame having a first transversely extending frame strut located at said proximal portion, and a retaining bolt protruding at an obtuse angle with respect to the supporting frame, said retaining bolt being coupled to the pivot pin in a rotationally fixed manner.

3. Head restraint according to claim 2, further comprising a second transversely extending frame strut located at a distal portion of the head cushion which is higher in the functional position, said first transversely extending frame strut having wider upholstery in a vertical direction than said second transversely extending frame strut.

4. Head restraint according to claim 1, wherein said backrest defines at least one guide sleeve, and wherein said bearing cup is coupled to a supporting hoop configured to be disposed in said at least one guide sleeve.

5. Head restraint according to claim 1, further comprising a lock which releasably locks the pivot pin to the bearing cup when the head cushion is in said functional position, said lock being at least one of manually releasable and releasable via a power assisted control, said lock automatically engaging when the head cushion is pivoted into said functional position.

6. Head restraint according to claim 5, wherein the lock comprises a recess in the pivot pin and a locking pin retained in an axially displaceable manner on the bearing cup, said locking pin being engageable with the recess under a spring force of a locking spring.

7. Head restraint according to claim 6, further comprising a solenoid having an armature coupled to said locking pin, said locking pin being displaceable against the spring force of the locking spring via excitation of said solenoid.

8. Head restraint according to claim 7, further comprising a release lever pivotably disposed on said bearing cup and coupled to said locking pin, said locking pin being displaceable against the spring force via said release lever.

9. Head restraint according to claim 6, further comprising a release lever pivotably disposed on said bearing cup and coupled to said locking pin, said locking pin being displaceable against the spring force via said release lever.

10. Head restraint according to claim 5, further comprising a restoring spring coupled to said pivot pin, said restoring spring being tensioned when the head cushion is moved to said functional position.

11. Head restraint according to claim 10, wherein the restoring spring is a spiral spring or a leg spring disposed around said pivot pin, said restoring spring having one spring end coupled to the bearing cup and having another spring end coupled to the pivot pin.

12. Head restraint according to claim 1, further comprising a covering hood arranged to cover said retaining device, said covering hood being at least approximately aligned with an upper edge of the backrest.

13. Head restraint according to claim 12, wherein said head cushion and said covering hood are configured and said pivot pin is coupled to said head cushion such that an upper edge of the head cushion, when in the lower nonfunctional position, is essentially flush with an upper edge of the covering.

14. Retaining device for pivotably coupling a head cushion to a vehicle seat backrest, comprising:

a bearing to be coupled to the vehicle seat backrest such that a pivot axis defined by said bearing extends at least approximately perpendicularly to a front surface of the backrest;

a pivot pin adapted to be positioned above the backrest and coupled to a lower portion of the head cushion, said pivot pin being disposed in said bearing to be rotatable about said pivot axis between a first position corresponding to an upper functional position of the head cushion and a second position corresponding to a lower nonfunctional position of the head cushion; and at least one locking mechanism which releasably locks said pivot pin to said bearing in said first position, wherein the locking mechanism comprises a recess in the pivot pin and a locking pin axially displaceably disposed on the bearing, said locking pin being releasably engageable with the recess.

15. Retaining device according to claim 14, further comprising a solenoid having an armature coupled to said locking pin, said locking pin being releasable from said recess via excitation of said solenoid.

16. Retaining device according to claim 15, further comprising a release lever pivotably disposed on said bearing and coupled to said locking pin, said locking pin being releasable from said recess via said release lever.

17. Retaining device according to claim 14, further comprising a release lever pivotably disposed on said bearing and coupled to said locking pin, said locking pin being releasable from said recess via said release lever.

18. Head restraint system, comprising the retaining device of claim 16 and the head cushion, said head cushion including a supporting frame, said pivot pin being coupled to said supporting frame via a retaining bolt, said retaining bolt being fixed non-rotatably to said supporting frame and being fixed non-rotatably to said pivot pin.

19. Head restraint system according to claim 18, further comprising the vehicle seat backrest, said vehicle seat backrest defining at least one guide sleeve, said bearing being coupled to a supporting hoop configured to be disposed in said at least one guide sleeve.

20. A method of pivotably coupling a head cushion to a vehicle seat backrest, comprising:

coupling a bearing to the vehicle seat backrest such that a pivot axis defined by said bearing extends at least approximately perpendicularly to a front surface of the backrest;

coupling a pivot pin to a lower portion of the head cushion;

coupling said pivot pin to said bearing to be rotatable about said pivot axis between a first position corresponding to an upper functional position of the head cushion and a second position corresponding to a lower nonfunctional position of the head cushion wherein said pivot pin is positioned above said backrest; and providing at least one locking mechanism to releasably lock said pivot pin to said bearing in said first position.

* * * * *